United States Patent
Takano (10) Patent No.: US 7,480,483 B2
(45) Date of Patent: Jan. 20, 2009

(54) MOBILE BROADCAST RECEIVING APPARATUS AND CONTROL METHOD THEREFOR

(75) Inventor: Koji Takano, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 611 days.

(21) Appl. No.: 11/282,477

(22) Filed: Nov. 21, 2005

(65) Prior Publication Data

US 2006/0217059 A1    Sep. 28, 2006

(30) Foreign Application Priority Data

Mar. 28, 2005    (JP) ............... 2005-091530

(51) Int. Cl.
*H04B 1/40*    (2006.01)
(52) U.S. Cl. ............... 455/3.02; 455/234.1; 455/254
(58) Field of Classification Search ............... None
See application file for complete search history.

(56) References Cited

U.S. PATENT DOCUMENTS 6,978,117 B2 * 12/2005 Zerod et al. ............... 455/3.02

2006/0264191 A1 * 11/2006 Lai ............... 455/127.1
2007/0105513 A1 * 5/2007 Son et al. ............... 455/132

FOREIGN PATENT DOCUMENTS

JP    2004-312349    11/2004

* cited by examiner

*Primary Examiner*—Thanh C Le
(74) *Attorney, Agent, or Firm*—Finnegan, Henderson, Farabow, Garrett & Dunner, L.L.P.

(57) ABSTRACT

A mobile broadcast receiving apparatus capable of stably receiving mobile broadcasting even with rapid variation in a reception level and yet capable of reducing the power consumption and a control method for such apparatus are provided. The mobile broadcast receiving apparatus, which selectively receives a broadcast radio wave from a geostationary satellite or a radio wave retransmitted from a gap filler, controls switching of at least one of a dynamic range of a low noise amplifier (LNA), a time constant of an automatic gain control circuit (AGC), and ON/OFF of an antenna diversity, according to a reception status of the mobile broadcast receiving apparatus.

12 Claims, 10 Drawing Sheets

FIG.10

MOBILE BROADCAST RECEIVING APPARATUS AND CONTROL METHOD THEREFOR

CROSS-REFERENCE TO RELATED APPLICATIONS

This application is based upon and claims the benefit of priority from the prior Japanese Patent Application No. 2005-91530, filed on Mar. 28, 2005; the entire contents of which are incorporated herein by reference.

BACKGROUND OF THE INVENTION

1. Field of the Invention

This invention relates to a mobile broadcast receiving apparatus which selectively receives either broadcast radio waves from a geostationary satellite or radio waves retransmitted from a gap filler according to reception levels thereof, and a control method for such apparatus. In particular, this invention relates to a mobile broadcast receiving apparatus which is capable of rapid recovery from image distortion and reducing the power consumption by appropriately controlling the switching of the dynamic range of a low noise amplifier (LNA), the time constant of an automatic gain control circuit (AGC), and ON and OFF of antenna diversity, and a control method for such apparatus.

2. Description of the Related Art

Mobile broadcasting is one of new satellite broadcast services, which enables a user to enjoy sharp and clear video reception even in a moving vehicle or open air.

In the mobile broadcasting, broadcast radio waves are basically received from a geostationary satellite to be reproduced into video or the like. On the other hand, in order to enable reception at locations where direct reception of broadcast radio waves from the geostationary satellite is impossible, terrestrial retransmitting equipment, which is called "gap filler", is installed to receive broadcast radio waves from the geostationary satellite and to retransmit the received radio waves.

The gap filler is installed at a location where direct reception of broadcast radio waves from the geostationary satellite is impossible, for example in the shade of a building.

The provision of a gap filler enables a mobile broadcast receiving apparatus to selectively receive either broadcast radio waves transmitted directly from the geostationary satellite or radio waves retransmitted from the gap filler. This makes it possible for a user to enjoy sharp and clear video reception even in a moving vehicle or in open air.

A satellite-mobile broadcasting system disclosed in Japanese Patent Application Laid-Open No. 2004-312349 is one of such apparatuses.

In the mobile broadcasting, CDM (code division multiplexing) waves are transmitted from a geostationary satellite. A reception side receives the CDM waves by an antenna, and sequentially processes the received signal by an RF module including a low noise amplifier (LNA) and an automatic gain control circuit (AGC), a demodulation module, and a decoding module to reproduce and store the received video and audio signals.

On the other hand, the gap filler is installed, for example, on a rooftop of a building on the ground so as to cover the radio silent zone of the geostationary satellite. The gap filler receives broadcast radio waves from the satellite, amplifies the amplitude thereof, and retransmits the radio waves.

In the mobile broadcast receiving apparatus which selectively receives either broadcast radio waves transmitted directly from the geostationary satellite or radio waves retransmitted from the gap filler, the selective reception is conducted according to reception levels of the broadcast radio waves from the geostationary satellite and the retransmitted radio waves from the gap filler. In the real field, there occurs a difference between the reception level on the ground of the broadcast radio waves from the geostationary satellite which is about 36,000 Km up in the air and the reception level of the radio waves retransmitted from the gap filler which is installed on the ground.

A user who carries the mobile broadcast receiving apparatus is unable to come close to the geostationary satellite, but able to do so to the gap filler. Therefore, the reception level of the radio waves retransmitted from the gap filler (gap filler waves) varies more significantly.

Specifically, the reception level of the broadcast radio waves from the geostationary satellite (satellite waves) is always low, while the reception level of the gap filler waves becomes higher as the user comes closer to the gap filler.

Figure 9:
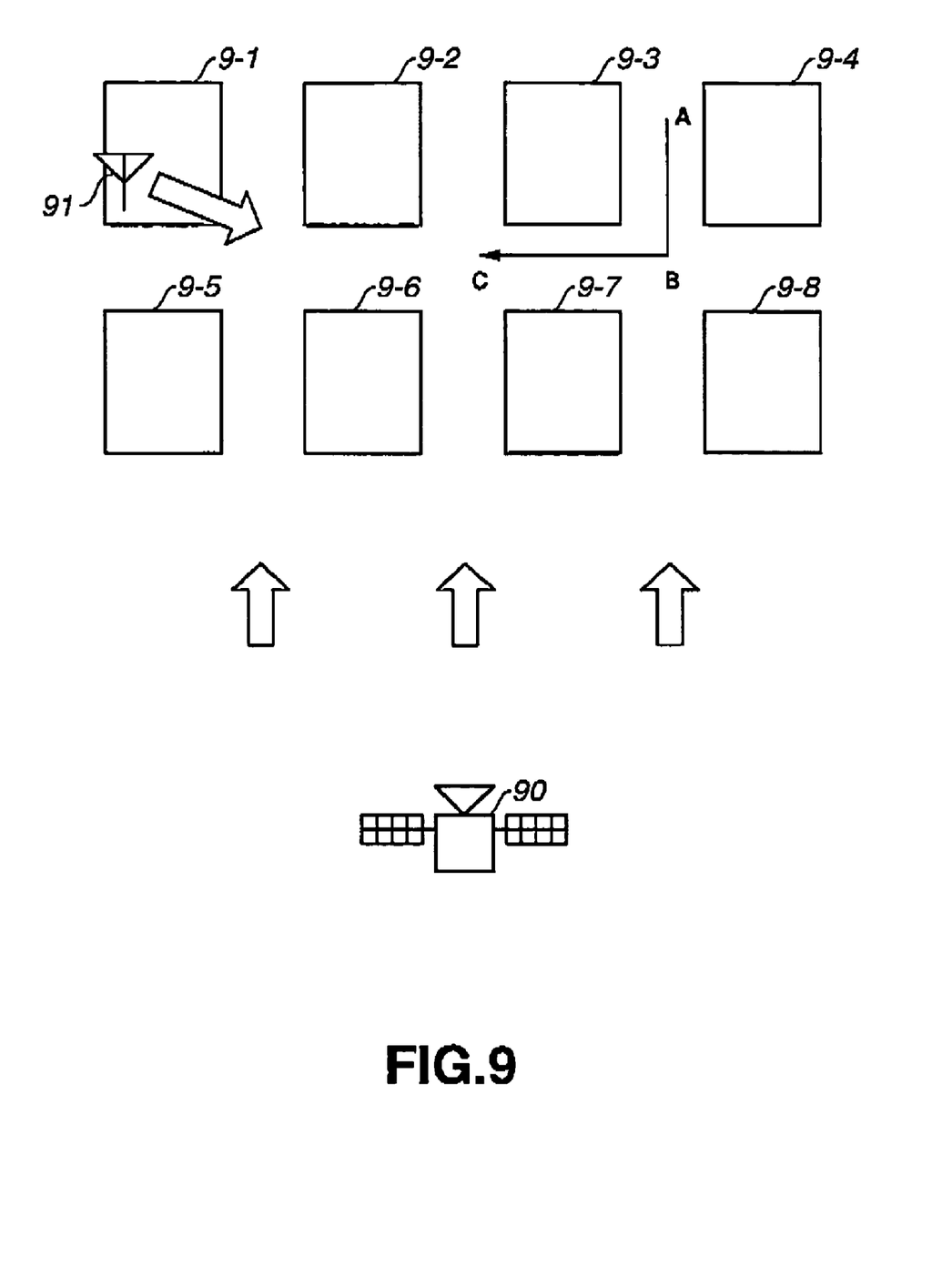
FIG. 9 illustrates an example of configuration of the mobile broadcast system.

Consideration is given, for example, to the case in which the user carrying the mobile broadcast receiving apparatus moves through a group of buildings consisting of buildings 9-1 to 9-8, as shown in FIG. 9.

It is assumed here that a gap filler 91 is installed on the rooftop of the building 9-1.

Since the geostationary satellite 90 is located far enough from the building group, the satellite waves from the geostationary satellite 90 reach the building group from a fixed direction, and the reception level of the satellite waves is always low.

In contrast, the reception level of gap filler waves from the gap filler 91 varies in accordance with the distance between the mobile broadcast receiving apparatus and the gap filler 91.

Figure 10:
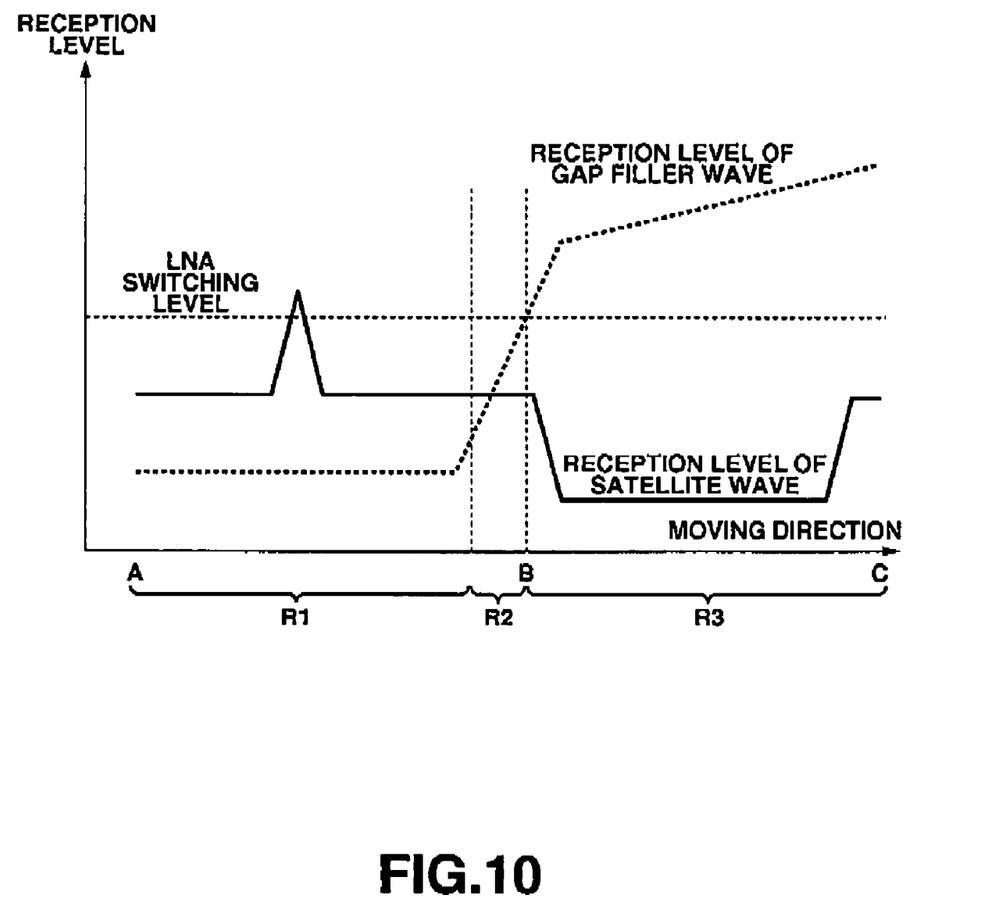
FIG. 10 illustrates an example of reception levels of the mobile broadcast receiving apparatus when a user carrying the mobile broadcast receiving apparatus moves in the field with the distributed electric field strength shown in FIG. 9 from point A, to point B, and to point C.

FIG. 10 shows an example of reception levels at the mobile broadcast receiving apparatus when the user carrying the apparatus moves in the field with the distributed electric field strength shown in FIG. 9 from point A, to point B, and to point C.

While the user is moving from point A to point B, the mobile broadcast receiving apparatus carried by the user is separated from the gap filler 91 by a long distance. Therefore, the reception level of the gap filler waves is on average lower than that of the satellite waves (region R1).

In contrast, when the user moves from point B to point C, the mobile broadcast receiving apparatus carried by the user is brought closer to the gap filler 91, and hence the reception level of the gap filler waves increases rapidly. Therefore, the reception level of the gap filler waves is on average higher than that of the satellite waves (region R3).

When in the vicinity of point B, the reception level of the gap filler waves becomes substantially equal to that of the satellite waves (region R2).

In the regions R1 and region R3, there occurs fading or shadowing due to effects of objects on the ground, which fluctuates the reception level. However, the possibility is low that the relationship in reception level between the gap filler waves and the satellite waves is reversed.

In the region R3, the reception level of the gap filler waves is relatively stable since the distance between the mobile broadcast receiving apparatus and the gap filler 91 is small.

In contrast, in the region R2, the relationship in reception level between the gap filler waves and the satellite waves changes frequently.

The range of level variation of the satellite waves from the geostationary satellite is small, whereas the range of level variation of the gap filler waves from the gap filler is large. Therefore, the dynamic range needs to be switched in a low noise amplifier (LNA) which low-noise amplifies the satellite waves and gap filler waves in common.

However, the reception level the satellite waves may temporarily increase due to noises or the like in the region R1 where the reception level of the gap filler waves is on average lower than that of the satellite waves. If the reception level of the satellite waves exceeds the switching level set for the dynamic range of the low-noise amplifier circuit as shown in FIG. 10, the dynamic range of the low-noise amplifier circuit is thereupon switched. This may eventually hinder appropriate demodulation of the waves.

In the region 2 where the reception level of the gap filler waves on average is substantially equal to the reception level of the satellite waves, for example, rapid switching between the gap filler waves and the satellite waves may become impossible due to the time constant of the automatic gain control circuit (AGC).

When antenna diversity is employed, for example, the antenna diversity will be used also in the region R3 where the use of the antenna diversity is unnecessary since the reception level of the gap filler waves is on average higher than that of the satellite waves. This will pose a problem of wasteful consumption of power.

It is therefore an object of this invention to provide a mobile broadcast receiving apparatus which is capable of stably receiving mobile broadcasting even if rapid variation occurs in the reception level, and yet capable of reducing power consumption, and a control method for such apparatus.

SUMMARY OF THE INVENTION

This invention relates to a mobile broadcast receiving apparatus which selectively receives either a broadcast radio wave from a geostationary satellite or a radio wave retransmitted from a gap filler according to a reception level thereof, and the apparatus is designed such that mobile broadcasting can be received stably even if rapid variation occurs in the reception level and yet the power consumption can be reduced by appropriately controlling the switching of at least one of a dynamic range of a low noise amplifier (LNA), a time constant of an automatic gain control circuit (AGC), and ON and OFF of antenna diversity, according to the reception status.

An aspect of the present invention provides a mobile broadcast receiving apparatus which selectively receives broadcast radio waves from a geostationary satellite or radio waves retransmitted from a gap filler according to a reception level thereof, the apparatus comprising: a low-noise amplifier circuit which low-noise amplifies a received signal; a level detection unit which detects the reception level; a received wave discrimination unit which determines whether the wave being received is the broadcast radio wave from the geostationary satellite or the radio wave retransmitted from the gap filler; and a range switching unit which switches a dynamic range of the low-noise amplifier circuit to a lower range when either the reception level detected by the level detection unit is not higher than a preset range switching level, or the received wave discrimination unit determines that the wave being received is the broadcast radio wave from the geostationary satellite, and switches the dynamic range of the low-noise amplifier circuit to an upper range when the reception level detected by the level detection unit is higher than the preset range switching level and the received wave discrimination unit determines that the wave being received is the radio wave retransmitted from the gap filler.

Another aspect of the present invention provides a mobile broadcast receiving apparatus which selectively receives a broadcast radio wave from a geostationary satellite or a radio wave retransmitted from a gap filler according to a reception level thereof, the apparatus comprising: an automatic gain control circuit which automatically controls a gain of a received signal; a switching frequency determination unit which determines a switching frequency between the broadcast radio wave from the geostationary satellite and the radio wave retransmitted from the gap filler; and a time constant switching unit which switches a time constant of the automatic gain control circuit to a smaller value when the switching frequency determination unit determines that the switching frequency is higher than a preset threshold, and switches the time constant of the automatic gain control circuit to a greater value when the switching frequency determination unit determines that the switching frequency is not higher than the threshold.

Still another aspect of the present invention provides a mobile broadcast receiving apparatus which selectively receives a broadcast radio wave from a geostationary satellite or a radio wave retransmitted from a gap filler according to a reception level thereof, the apparatus comprising: a first reception circuit which receives either the broadcast radio wave from the geostationary satellite or the radio wave retransmitted from the gap filler; a second reception circuit which receives either the broadcast radio wave from the geostationary satellite or the radio wave retransmitted from the gap filler; a diversity circuit which selectively switches between an output of the first reception circuit and an output of the second reception circuit according to output levels of the first and second reception circuits; a level detection unit which detects the reception level; a received wave discrimination unit which determines whether the wave being received is the broadcast radio wave from the geostationary satellite or the radio wave retransmitted from the gap filler; and a diversity operation switching unit which switches the diversity circuit to an active state when either the reception level detected by the level detection unit is not higher than a preset threshold level or the received wave discrimination unit determines that the wave being received is the broadcast radio wave from the geostationary satellite, and switches the diversity circuit to an inactive state when the reception level detected by the level detection unit is higher than the preset threshold level and the received wave discrimination unit determines that the wave being received is the radio wave retransmitted from the gap filler.

Still another aspect of the present invention provides a control method for a mobile broadcast receiving apparatus which comprises a low-noise amplifier circuit which low-noise amplifies a received signal and an automatic gain control circuit which automatically controls a gain of a received signal, and which selectively receives a broadcast radio wave from a geostationary satellite or a radio wave retransmitted from a gap filler according to a reception level thereof, the method comprising: determining whether the wave being received is the broadcast radio wave from the geostationary satellite or the radio wave retransmitted from the gap filler; and switching a dynamic range of the low-noise amplifier circuit to a lower range when either the reception level is not higher than a preset range switching level or it is determined that the wave being received is the broadcast radio wave from the geostationary satellite, and switching the dynamic range of the low-noise amplifier circuit to an upper range when the reception level is higher than the preset range switching level and it is determined that the wave being received is the radio wave retransmitted from the gap filler.

Yet still another aspect of the present invention provides a control method for a mobile broadcast receiving apparatus which comprises a first reception circuit, a second reception circuit, and a diversity circuit which selectively switches between an output of the first reception circuit and an output of the second reception circuit according to output levels of the first and second reception circuits, and which selectively receives a broadcast radio wave from a geostationary satellite or a radio wave retransmitted from a gap filler according to a reception level thereof, the control method comprising: determining whether the wave being received is the broadcast radio wave from the geostationary satellite or the radio wave retransmitted from the gap filler; and switching the diversity circuit to an active state when either the reception level is not higher than a preset threshold level or it is determined that the wave being received is the broadcast radio wave from the geostationary satellite, and switching the diversity circuit to an inactive state when the reception level is higher than the preset threshold level and it is determined that the wave being received is the radio wave retransmitted from the gap filler.

According to the above-mentioned aspects of the invention, a mobile broadcast receiving apparatus, which selectively receives either a broadcast radio wave from a geostationary satellite or a radio wave retransmitted from a gap filler, is designed to control switching of at least one of a dynamic range of a low noise amplifier (LNA), a time constant of an automatic gain control circuit (AGC), and ON and OFF of antenna diversity, according to a reception status of the mobile broadcast receiving apparatus. Therefore, the mobile broadcast receiving apparatus is capable of stably receiving mobile broadcasting even if rapid variation occurs in the level of received waves. The mobile broadcast receiving apparatus is also capable of rapidly recovering from image distortion and reducing power consumption.

DETAILED DESCRIPTION OF THE INVENTION

A mobile broadcast receiving apparatus and a control method therefor according embodiments of this invention will now be described with reference to the accompanying drawings.

Figure 1:
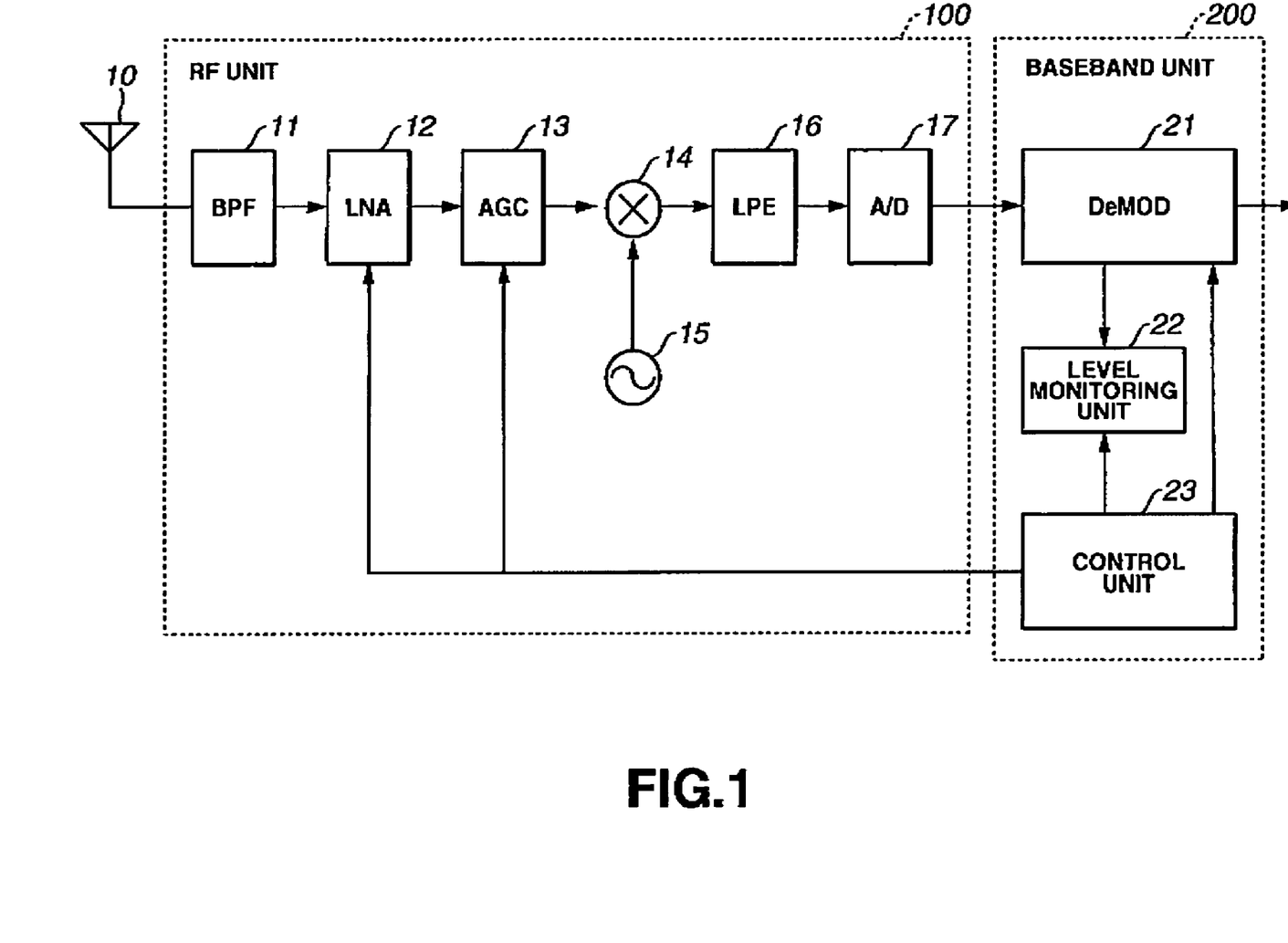
FIG. 1 is a block diagram showing a principal part of a mobile broadcast receiving apparatus according to an embodiment of this invention.

FIG. 1 is a block diagram showing a principal part of the mobile broadcast receiving apparatus according to an embodiment of this invention.

As shown in FIG. 1, the mobile broadcast receiving apparatus includes an RF unit 100 for processing a radio signal received at an antenna 10, and a baseband unit 200 for processing output of the RF unit 100.

The RF unit 100 includes a bandpass filter (BPF) 11 which band-pass filters a radio signal received at the antenna 10, a low-noise amplifier circuit (LNA) 12 which low-noise amplifies output of the BPF 11, an automatic gain control circuit (AGC) 13 which automatically controls gain of output of the LNA 12, a mixer circuit 14 which mixes the output of the AGC 13 with the output of a local oscillator 15, a lowpass filter (LPF) 16 which low-pass filters output of the mixer circuit 14, and an analog-digital converter circuit (A/D) 17 which analog-digital converts output of the LPF 16.

The baseband unit 200 includes a signal processing unit 21, a level monitoring unit 22, and a control unit 23.

The signal processing unit 21 receives output of the A/D converter 17, detects a reception level of the received waves, determines whether the waves being received satellite waves from the geostationary satellite or gap filler waves from the gap filler, and decodes or demodulates the output of the A/D converter 17.

The level monitoring unit 22 monitors the reception level of the received waves detected by the signal processing unit 21.

The control unit 23 performs setting of a scramble code for decoding processing of output of the A/D converter 17, controls the switching of the dynamic range of the LNA 11 based on the reception level of the received waves monitored by the level monitoring unit 22, and controls the switching of the time constant of the AGC 13.

The control unit 23 is connected to the LNA 11 and the AGC 13, for example, by an address bus, a data bus, and a chip select signal line, so that the switching control of dynamic range of the LNA 11 or the switching control of the time constant of the AGC 13 by the control unit 23 is performed by selecting either the LNA 11 or the AGC 13 by means of the address bus and the chip select signal line and transmitting control information to the selected one of the LNA 11 and AGC 13 via the data bus.

The control unit 23 may be connected to the LNA 11 and the AGC 13 by a serial data line and a serial clock line to perform similar control.

First Embodiment

According to a first embodiment, the control unit 23 in the configuration shown in FIG. 1 controls the switching of dynamic range of the LNA 11 according to the reception level of received waves and information indicating whether the waves being received are satellite waves or gap filler waves.

Figure 2:
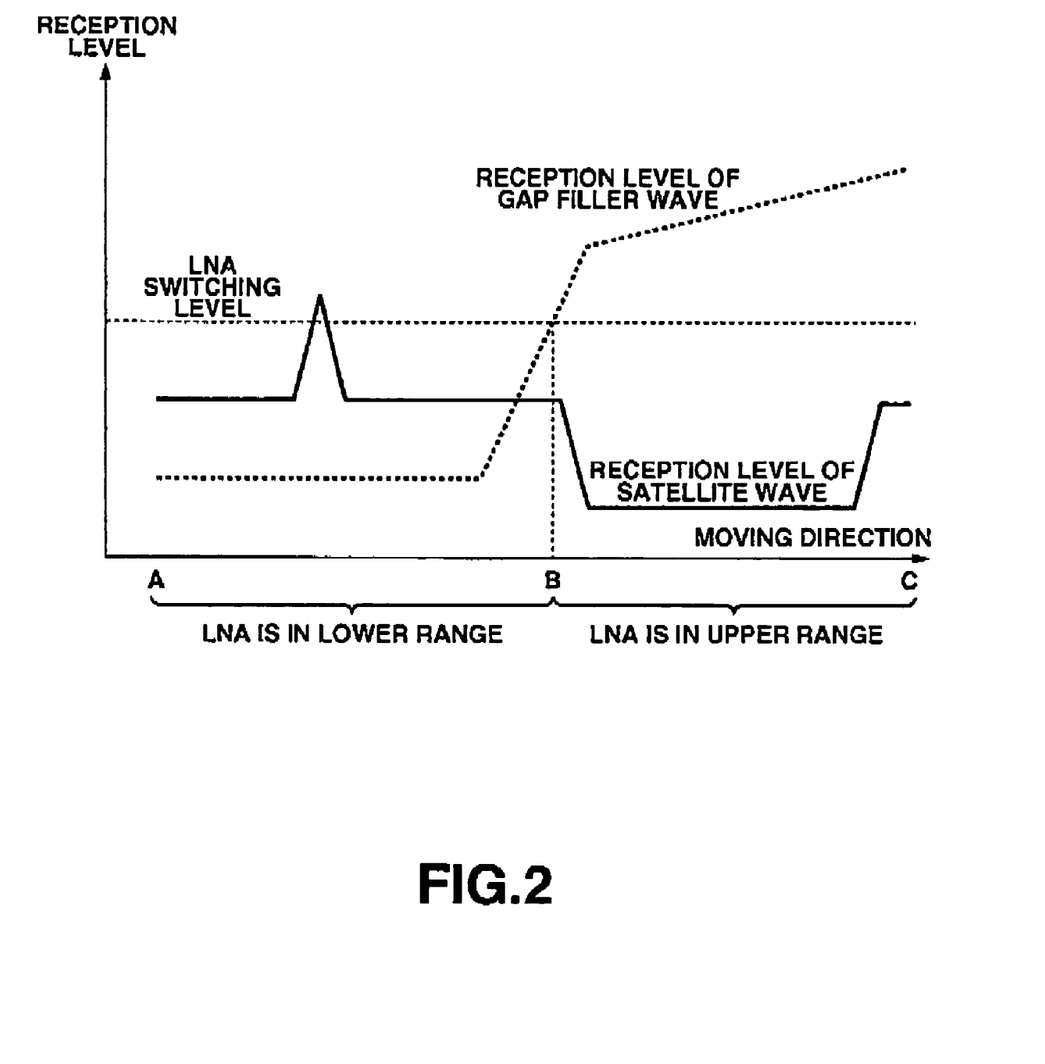
FIG. 2 is a diagram illustrating the switching control of the dynamic range of an LNA according a first embodiment.

FIG. 2 illustrates the switching control of the dynamic range of the LNA 11 according to the first embodiment.

FIG. 2 shows, like FIG. 10, the reception level of the mobile broadcast receiving apparatus and the switching status of the dynamic range of the LNA 11 when a user carrying the mobile broadcast receiving apparatus moves in the field with the distributed electric field strength shown in FIG. 9 from point A, to point B, and to point C.

In the first embodiment, the dynamic range of the LNA 11 is fixed to a lower range when the received waves are satellite waves or when the reception level of the gap filler waves is relatively low, that is, while the user carrying the mobile broadcast receiving apparatus is moving from point A to point B. The dynamic range of the LNA 11 is switched to an upper range when the received waves are gap filler waves and the reception level is relatively high, that is, while the user carrying the mobile broadcast receiving apparatus is moving from point B to point C.

According to the first embodiment, therefore, the dynamic range of the LNA 11 is switched between the lower level and the upper level depending not only on the reception level, but also on whether the received waves are satellite waves or gap filler waves.

The first embodiment is particularly characterized in that, while satellite waves are being received, the dynamic range of the LNA 11 is fixed to the lower level even if the level of the received waves temporarily exceeds the switching level of the dynamic range of the LNA 11 due to noise, for example.

Figure 3:
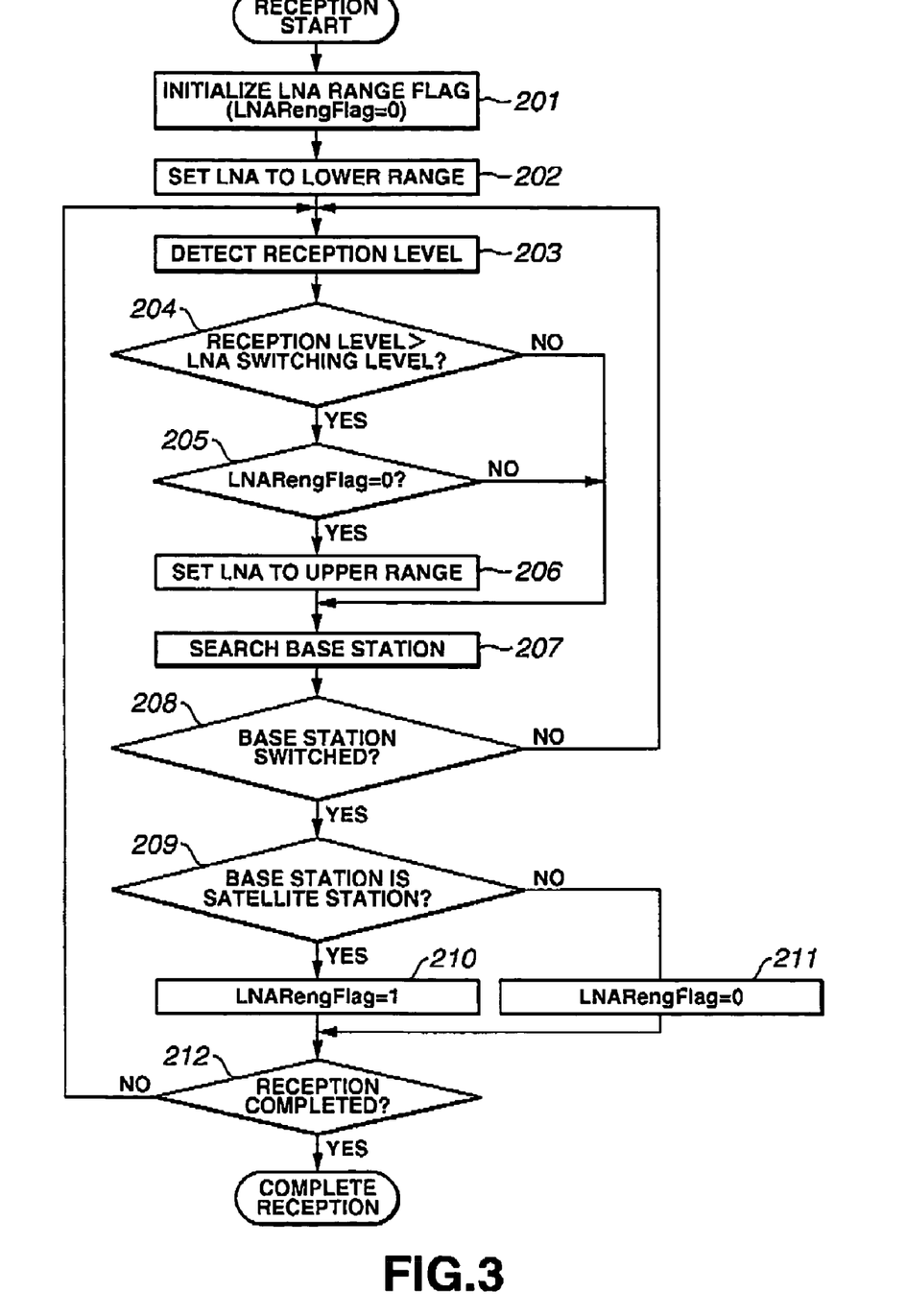
FIG. 3 is a flowchart illustrating the switching control of the dynamic range of the LNA by a control unit according to the first embodiment.

FIG. 3 is a flowchart illustrating the switching control of the dynamic range of the LNA 11 by the control unit 23 according to the first embodiment described above.

Referring to FIG. 3, when the mobile broadcast receiving apparatus shown in FIG. 1 starts reception of mobile broadcasting, the control unit 23 initializes the LAN range flag LNARengFlag by setting the same to zero (LNARengFlag=0) (step 201).

The control unit 23 then transmits to the LNA 11 control information to switch the dynamic range to the lower range so that the dynamic range of the LNA 11 is set to the lower range (step 202).

The reception level is detected by the level monitoring unit 22 (step 203), and it is determined whether or not the detected reception level is higher than a preset LNA switching level (step 204). If the reception level is higher than the LNA switching level (YES in step 204), it is then determined whether or not the LAN range flag LNARengFlag is zero (step 205). If the LAN range flag LNARengFlag is zero (YES in step 205), the control unit 23 transmits to the LNA 11 control information to switch the dynamic range of the LNA 11 to the upper range so that the dynamic range of the LNA 11 is set to the upper range (step 206), and then searches a current base station (step 207).

If it is determined, in step 204, that the reception level is not higher than the preset LNA switching level (NO in step 204), or if it is determined, in step 205, that the LAN range flag LNARengFlag is not zero (NO in step 205), the processing proceeds to step 207 without switching the dynamic range of the LNA 11 to the upper range.

If no base station switching occurs in the base station search in step 207 (NO in step 208), the processing returns to step 203.

If no switching of the base station occurs in the base station search in step 207 (YES in step 208), it is determined whether the base station is a satellite station or a gap filler based on the determination result whether the received waves are satellite waves or gap filler waves (step 209).

If the base station is a satellite station (YES in step 209), the LAN range flag LNARengFlag is set to one (step 210), whereas if the base station is not a satellite station but a gap filler (NO in step 209), the LAN range flag LNARengFlag is set to zero (step 211).

It is then determined whether the reception of the mobile broadcasting has been completed or not (step 212). If the mobile broadcasting reception has not been completed (NO in step 212), the processing returns to step 203 and repeats the similar processing steps. Whereas, if it is determined that the mobile broadcasting reception has been completed (YES in step 212), the switching control of the dynamic range of the LNA 11 is completed.

The processing steps shown in the flowchart of FIG. 3 will be described again with reference to FIG. 2. The initialization to set the LAN range flag LNARengFlag to zero is performed at point A (step 201), and the dynamic range of the LNA 11 is set to the lower range (step 202).

Since the reception level is lower than the LNA switching level (NO in step 204), the base station search is conducted (step 207). Since the base station is a satellite station (YES in step 209), the LAN range flag LNARengFlag is set to one (step 210).

The reception level is then detected in step 203. Even if it is determined that the reception level is higher than the LNA switching level (YES in step 204), the dynamic range of the LNA 11 is not switched to the upper range since the LAN range flag LNARengFlag is set to one (NO in step 205).

However, when the level of the gap filler waves becomes higher than the level of the satellite waves, the LAN range flag LNARengFlag is set to zero in step 211, and it is determined, in the next detection of the reception level (step 204), that the reception level is higher than the LNA switching level (YES in step 204), the dynamic range of the LNA 11 is switched to the upper level (step 206) since the LAN range flag LNARengFlag has been set to zero (YES in step 205).

This means that the dynamic range of the LNA 11 is fixed to the lower range if the received waves are satellite waves or if the reception level is not higher than the LNA switching level, while it is switched to the upper range if the received waves are gap filler waves and the reception level is higher than the LNA switching level.

According to such configuration, the dynamic range of the LNA 11 is fixed to the lower level even if the level of the satellite waves temporarily exceeds the LNA switching level due to noise or the like while the satellite waves are being received. Therefore, it is possible to reliably prevent the possibility that the received waves cannot be demodulated appropriately by the switching the dynamic range of the LNA 11.

Second Embodiment

According to a second embodiment, the control unit 23 in the configuration shown in FIG. 1 controls the switching of the time constant of the AGC 13, according to a switching frequency between the reception of satellite waves and the reception of gap filler waves.

The switching control of the time constant of the AGC 13 can be performed by feedback control of the reception level from the control unit 23.

Figure 4:
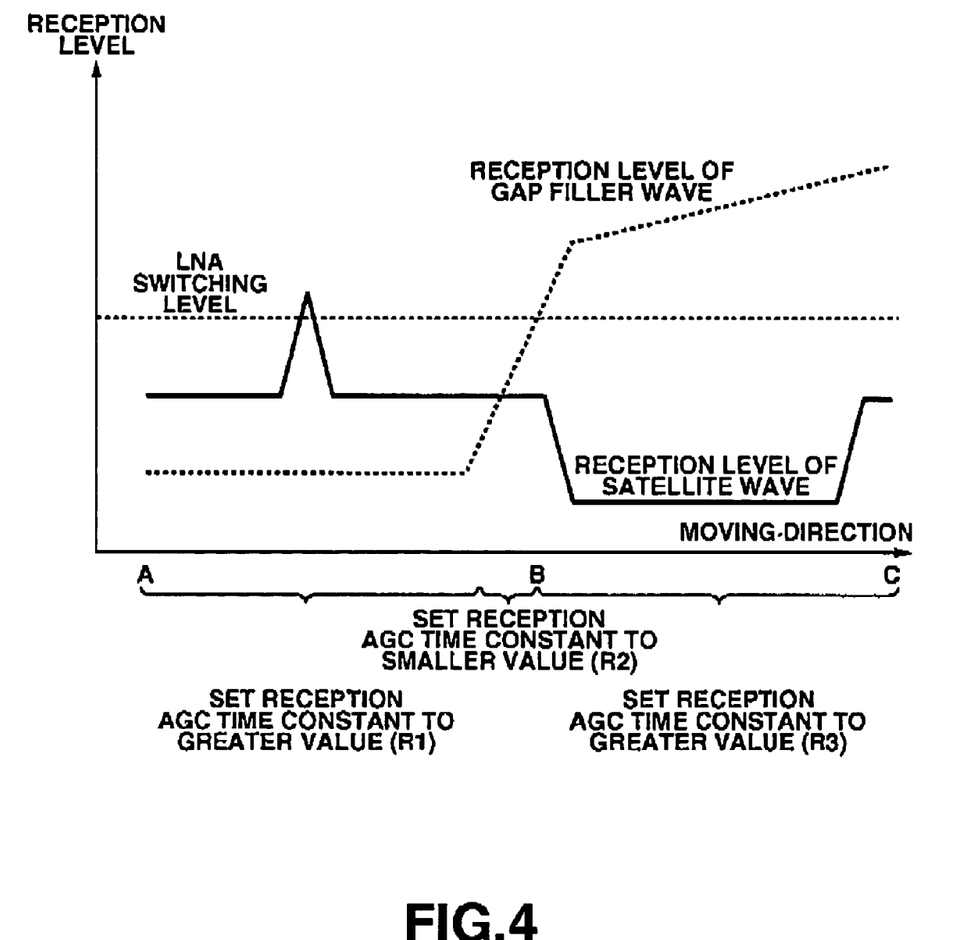
FIG. 4 is a diagram illustrating the switching control of the time constant of an AGC according to a second embodiment.

FIG. 4 illustrates the switching control of the time constant of the AGC 13 according to the second embodiment.

As shown in FIG. 10, when the user carrying the mobile broadcast receiving apparatus moves in the field with the distributed electric field strength shown in FIG. 9 from point A, to point B, and to point C, the reception level of the mobile broadcast receiving apparatus of the gap filler waves is on average lower than the reception level of satellite waves in the region R1 where the user moves from point A to point B. In the region R3 where the user moves from point B to point C, the reception level of the gap filler waves is on average higher than the reception level of satellite waves. In these regions R1 and R3, the possibility is low that the relationship in the reception level between the gap filler waves and the satellite waves is reversed.

In contrast, in the region R2 where the user is in the vicinity of point B and the reception level of the gap filler waves on average is substantially equal to the reception level of the satellite waves, the relationship in the reception levels between the gap filler waves and the satellite waves changes frequently.

According to the second embodiment, therefore, aiming to switch the reception of satellite waves and the reception of gap filler waves in an optimal manner and to realize stable reception, the time constant of the AGC 13 is switched to a smaller value in the region R2 where the switching frequency between the reception of satellite waves and the reception of gap filler waves is high, and the time constant of the AGC 13 is switched to a greater value in the regions R1 and R3 where the switching frequency between the reception of satellite waves and the reception gap filler waves is low.

Figure 5:
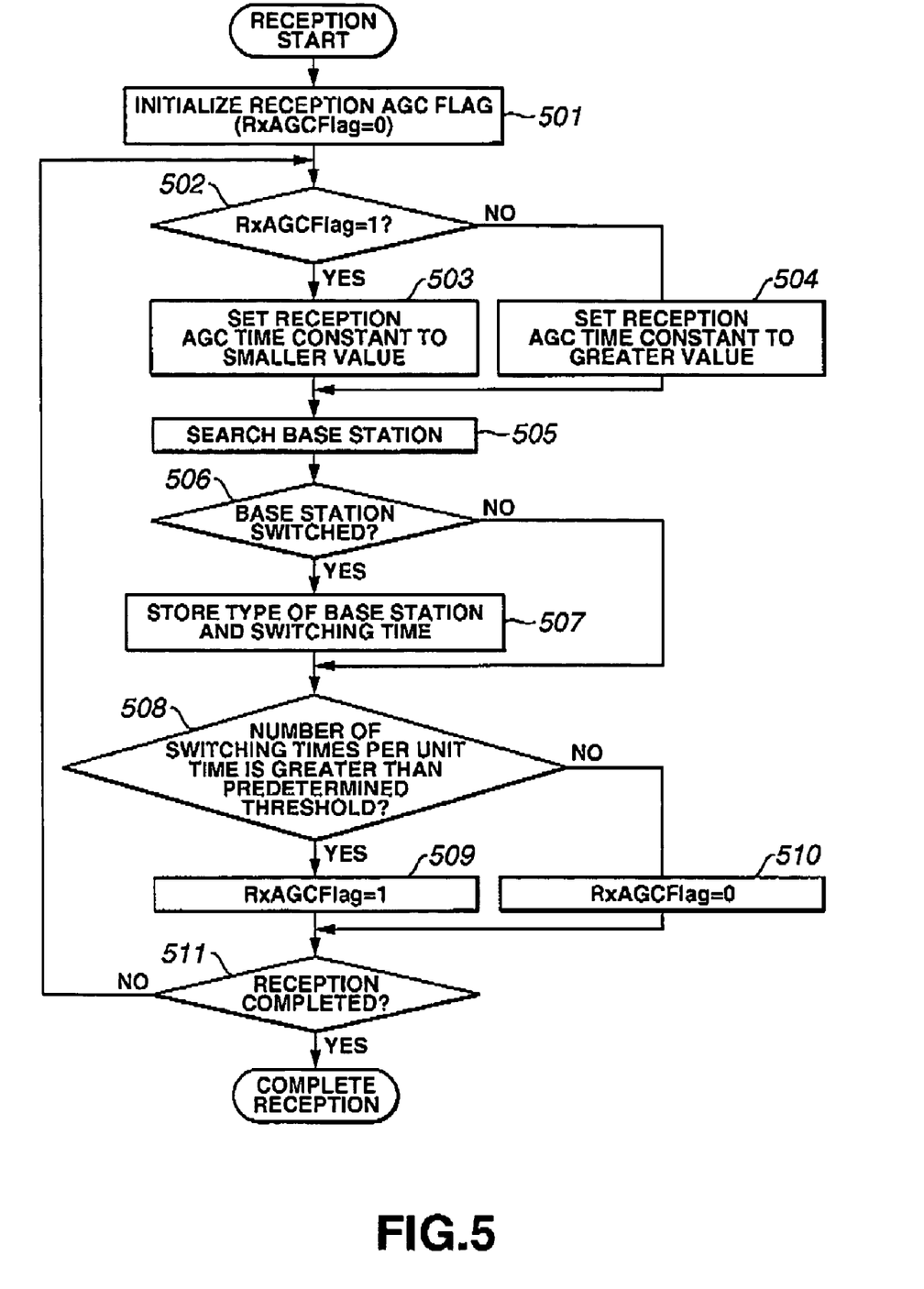
FIG. 5 is a flowchart illustrating the switching control of the time constant of the AGC by a control unit according to the second embodiment.

FIG. 5 is a flowchart illustrating the switching control of the time constant of the AGC 13 by the control unit 23 according to the second embodiment described above.

In FIG. 5, when the mobile broadcast receiving apparatus shown in FIG. 1 starts reception of mobile broadcasting, the control unit 23 initializes the reception AGC flag RxAGCFlag by setting the same to zero (step 501).

It is then determined whether the reception AGC flag RxAGCFlag is one or not (step 502). Since the reception AGC flag has been set to zero, the determination result is NO, and the control unit 23 transmits, to the AGC 13, control information to switch the reception AGC time constant to a greater value, so that the reception AGC time constant of the AGC 13 is set to a greater value (step 504).

If it is determined in step 502 that the reception AGC flag RxAGCFlag is one (YES in step 502), the control unit 23 transmits, to the AGC 13, control information to switch the reception AGC time constant to a smaller value, so that the reception AGC time constant of the AGC 13 is set to a smaller value (step 504).

Subsequently, the control unit 23 searches a current base station (step 505). If switching of base stations occurs (YES in step 506), the type of the base station (a satellite station or a gap filler) and the switching time are stored (step 507). If the current base station is a gap filler station, the reception of satellite waves is switched to the reception of gap filler waves. If the current base station is a satellite station, the reception of gap filler waves to the reception of satellite waves.

Further, if no switching of base stations occurs in step 506 (NO in step 506), the processing proceeds to step 508.

In step 508, the switching frequency, or the number of switching times per unit time between the satellite waves and the gap filler waves, is obtained based on the type of the base station and the switching time stored in step 507, and it is determined whether or not the number of switching times is greater than a predetermined threshold (step 508).

If the number of switching times per unit time between the satellite waves and the gap filler waves is greater than the predetermined threshold (YES in step 508), the reception AGC flag RxAGCFlag is set to one (step 509). If the number of switching times per unit time between the satellite waves and the gap filler waves is not greater than the predetermined threshold (NO in step 508), the reception AGC flag RxAGC-Flag is set to zero (step 510).

Subsequently, it is determined whether the reception of mobile broadcasting has been completed or not (step 511). If the reception of mobile broadcasting has not been completed (NO in step 511), the processing returns to step 502 and similar processing steps are repeated. If it is determined that the reception of mobile broadcasting has been completed (step 511 ℃YES), the switching control of the time constant of the AGC 13 is completed.

The processing illustrated in the flowchart of FIG. 5 will be described again with reference to FIG. 4. The initialization to set the reception AGC flag RxAGCFlag to zero is performed at point A (step 501), and the time constant of the LNA 11 is set to the greater value (step 502).

In the region R1 where the user is approaching toward the vicinity of point B, it is determined NO in step 508 and the status of the reception AGC flag RxAGCFlag being zero is kept unchanged. Therefore, it is determined NO in step 502 and the reception AGC time constant of the AGC 13 is maintained at the greater value.

However, when the user enters the region R2 in the vicinity of point B, and the switching frequency between the satellite waves and the gap filler waves exceeds the predetermined threshold (YES in step 508), the reception AGC flag RxAGC-Flag is set to one (step 509). In this case, it is determined YES in step 502, and the reception AGC time constant of the AGC 13 switched to the smaller value.

When the user then comes out of the region R2 and enters the region R3, it is determined NO in step 508, and hence the reception AGC flag RxAGCFlag is set to zero (step 510). Therefore, it is determined NO in step 502, and the reception AGC time constant of the AGC 13 is switched to the greater value.

This means that, in the regions R1 and R2 where the reception wave switching frequency between the reception of satellite waves and the reception of gap filler waves is low, the time constant of the AGC 13 is set to the greater value. Whereas, in the region R2 where the reception wave switching frequency between the satellite waves and the gap filler waves is high, the time constant of the AGC 13 is set to the smaller value.

According to such configuration, the switching between the satellite waves and the gap filler waves can be performed in an optimal and stable manner.

The switching control of the time constant of the AGC 13 according to the second embodiment may be performed either solely or in combination with the switching control of the dynamic range of the LNA 11 according to the first embodiment.

Third Embodiment

According to configuration of a third embodiment of this invention, an antenna diversity function is employed to make it possible to receive satellite waves from a geostationary satellite and gap filler waves from a gap filler in a still more stable manner.

Figure 6:
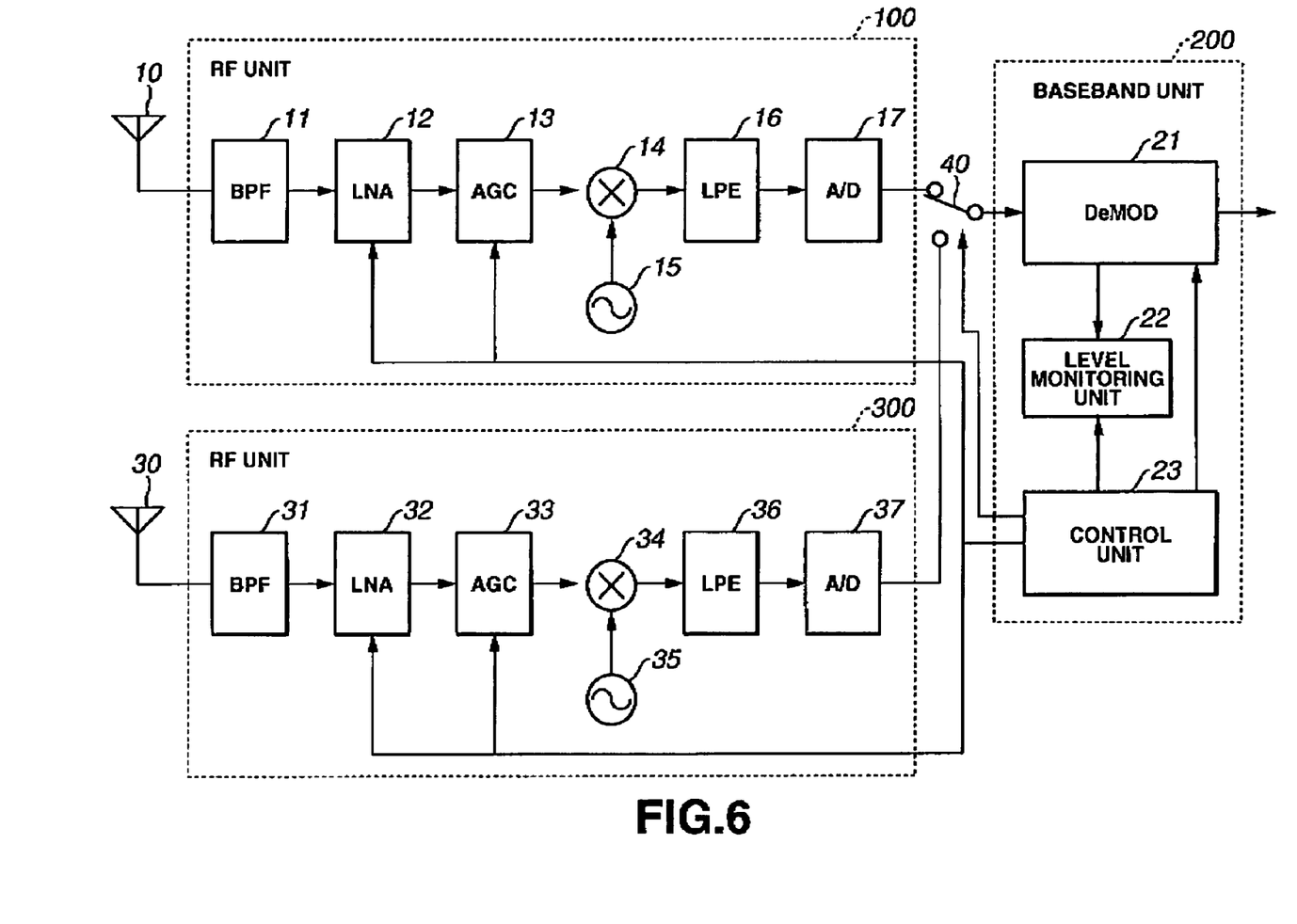
FIG. 6 is a block diagram illustrating a principal part of a mobile broadcast receiving apparatus according to another embodiment of this invention in which the antenna diversity function is employed.

FIG. 6 is a block diagram showing a principal part of a mobile broadcast receiving apparatus employing an antenna diversity function according to the third embodiment of this invention.

Referring to FIG. 6, the antenna diversity function is realized by providing an RF unit 100 for processing a radio signal received by an antenna 10 and an RF unit 300 for processing a radio signal received by an antenna 30, and switching between the output of the RF unit 100 and the output of the RF unit 300 by the control unit 23.

Specifically, as shown in FIG. 6, the RF unit 100 includes, like the RF unit 100 shown in FIG. 1, a bandpass filter (BPF) 11 which band-pass filters a radio signal received by the antenna 10, a low-noise amplifier circuit (LNA) 12 which low-noise amplifies output of the BPF 11, an automatic gain control circuit (AGC) 13 which automatically controls the gain of output of the LNA 12, a mixer circuit 14 which mixes the output of the AGC 13 and output of a local oscillator 15, a lowpass filter (LPF) 16 which low-pass filters output of the mixer circuit 14, and an analog-digital converter circuit (A/D) 17 which analog-digital converts output of the LPF 16.

The FR unit 300 includes, similarly to the FR unit 100, a bandpass filter (BPF) 31 which band-pass filters a radio signal received by the antenna 30, a low-noise amplifier circuit (LNA) 32 which low-noise amplifies output of the BPF 31, an automatic gain control circuit (AGC) 33 which automatically controls the gain of output of the LNA 32, a mixer circuit 34 which mixes the output of the AGC 33 and output of a local oscillator 35, a lowpass filter (LPF) 36 which low-pass filters output of the mixer circuit 34, and an analog-digital converter circuit (A/D) 37 which analog-digital converts output of the LPF 36.

The baseband unit 200 includes, like the configuration shown in FIG. 1, a signal processing unit 21, a level monitoring unit 22, and a control unit 23. The control unit 23 performs setting of a scramble code for decoding processing of output of the A/D converter 17 and controls the switching of the dynamic range of the LNA 11 and of the time constant of the AGC 13 based on the reception level of the received waves monitored by the level monitoring unit 22. Additionally, the control unit 23 controls the switching between the output of the RF unit 100 and the output of the RF unit 300 (antenna diversity function).

The antenna diversity function is carried out by the control unit 23 determining which one between the output of the RF unit 100 and the output of the RF unit 300 exhibits a better reception status, and switching a switch 40 according to the determination result.

In the configuration provided with the antenna diversity function according to the third embodiment as shown in FIG. 6, the control unit 23 turns the antenna diversity function ON if the received waves are satellite waves or the reception level is not higher than a preset threshold, whereas the control unit 23 turns the antenna diversity function OFF if the received waves are gap filler waves and the reception level is higher than the threshold. The power consumption is reduced by this ON/OFF control.

This ON/OFF control of the antenna diversity function is performed by the control unit 23 which determines whether the switching of the switch 40 is to be enabled or disabled.

Figure 7:
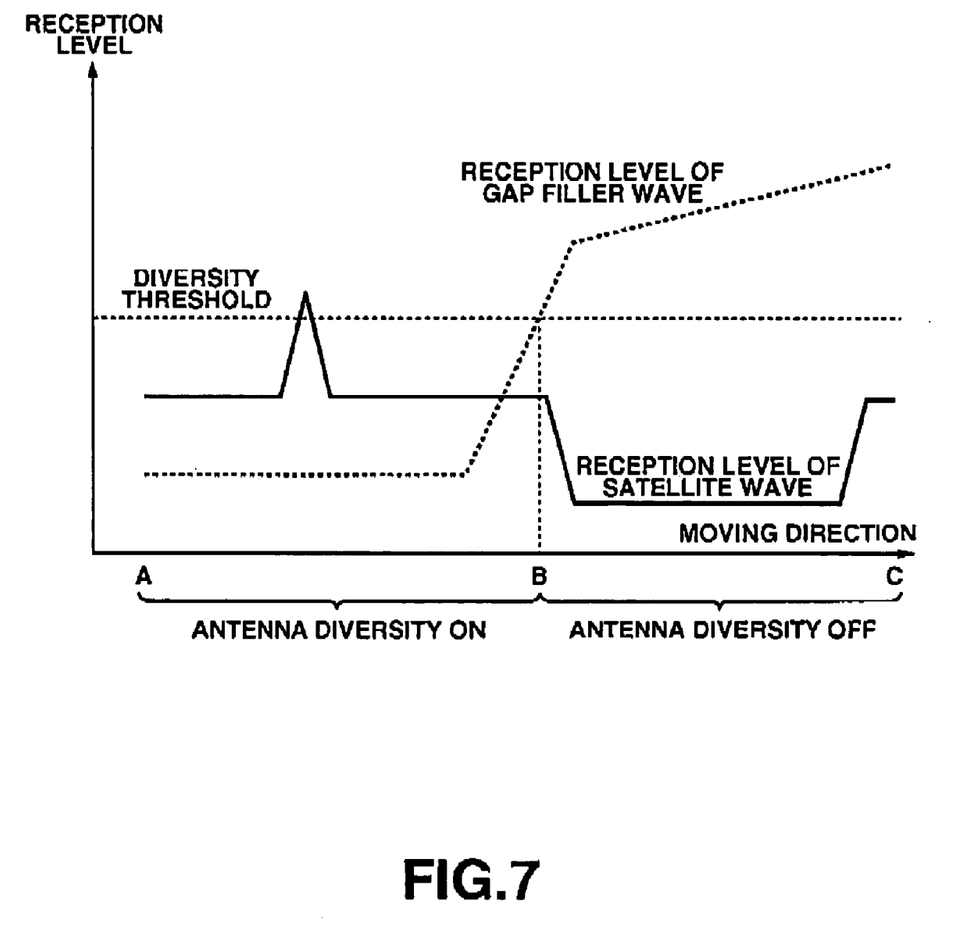
FIG. 7 is a diagram illustrating the ON and OFF control of the antenna diversity function according to a third embodiment.

FIG. 7 is a diagram illustrating the ON/OFF control of the antenna diversity function according to the third embodiment.

As shown in FIG. 7, when the user carrying the mobile broadcast receiving apparatus moves in the field with the distributed electric field strength shown in FIG. 9 from point A, to point B, and to point C, the reception levels of the gap filler waves and the satellite waves are both low while the user is moving from point A to point B. Whereas, while the user is moving from point B to point C, the reception level of the gap filler waves is stable at a high level.

This means that the antenna diversity function is active while the user is moving from point A to point B. The antenna diversity function is not necessarily required while the user is moving from point B to point.

In usual, however, the antenna diversity function is always ON, and thus the reception level of the gap filler waves is stable at a high level. Consequently, unnecessary power is consumed by this antenna diversity function while the user is moving from point B to point C.

According to the third embodiment, therefore, the power consumption is reduced by turning the antenna diversity function OFF when the received waves are gap filler waves and the reception level is higher than the threshold.

Figure 8:
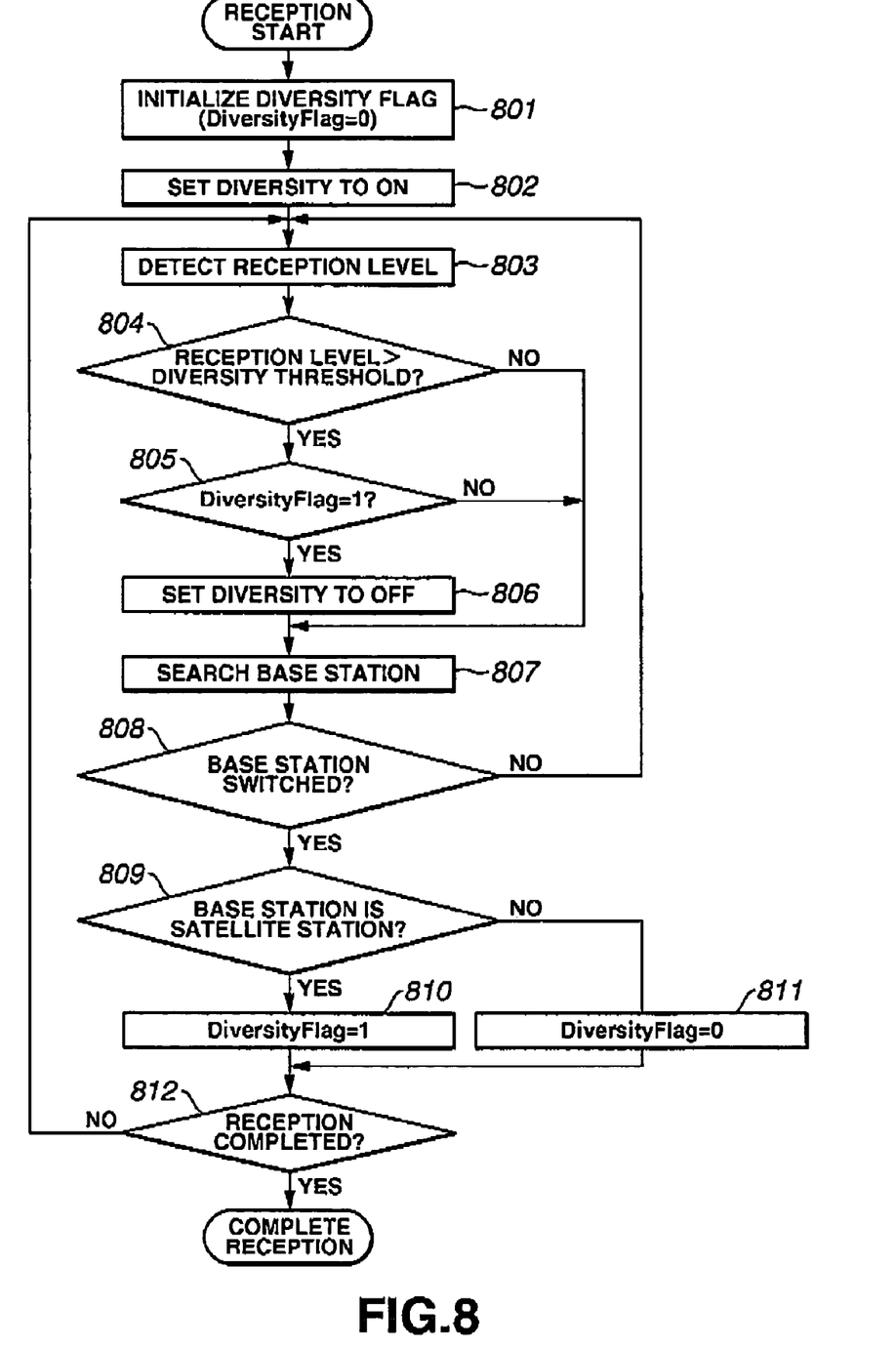
FIG. 8 is a flowchart illustrating the ON and OFF control of the antenna diversity function by a control unit 23 according to the third embodiment.

FIG. 8 is a flowchart illustrating the ON/OFF control of the antenna diversity function by the control unit 23 according to the third embodiment as described above. In FIG. 8, when the mobile broadcast receiving apparatus shown in FIG. 6 starts reception of mobile broadcasting, the control unit 23 first initializes a diversity flag DiversityFlag by setting the same to zero (step 801).

The control unit 23 then sets the diversity to ON to enable switching of the switch 40 (step 802).

Subsequently, the reception level is detected by the level monitoring unit 22 (step 803), and it is determined whether the detected reception level is higher than a preset diversity threshold (step 804). If the reception level is higher than the preset diversity threshold (YES in step 804), it is determined whether the diversity flag DiversityFlag is one or not (step 805). If the diversity flag DiversityFlag is one (YES in step 805), the control unit 23 sets the diversity to OFF to disable the switching of the switch 40 (step 806). Subsequently, the control unit 23 searches a current base station (step 807).

If it is determined in step 804 that the reception level is not higher than the preset diversity threshold (NO in step 804), or if it is determined in step 805 that the diversity flag DiversityFlag is not one (NO in step 805), the processing proceeds to step 807 without setting the diversity to OFF.

If the search of the base station in step 807 does not result in switching of the current base station (NO in step 808), the processing returns to step 803.

If the base station search in step 807 results in switching of the current base station (YES in step 808), it is determined whether the base station is a satellite station or a gap filler based on the result of determination whether the received waves are satellite waves or gap filler waves (step 809).

If the base station is a satellite station (YES in step 809), the diversity flag DiversityFlag is set to zero (step 810). Whereas, if the base station is not a satellite station but a gap filler (NO in step 809), the diversity flag DiversityFlag is set to one (step 811).

Subsequently, it is determined if the reception of the mobile broadcasting has been completed or not (step 812). If the reception of the mobile broadcast has not been completed (NO in step 812), the processing returns to step 803 to repeat similar processing steps. If it is determined that the reception of the mobile broadcasting has been completed (YES in step 812), the ON/OFF control of the antenna diversity function is completed.

The processing shown in the flowchart of FIG. 8 will be described again with reference to FIG. 7. The initialization to set the diversity flag DiversityFlag to zero is performed at point A (step 801), and the antenna diversity function is set to ON (step 802).

Since the reception level is lower than the diversity threshold (NO in step 804), the base station search is conducted (step 807). Since the base station is a satellite station (YES in step 809), the diversity flag DiversityFlag is set to zero (step 810).

Subsequently, the reception level is detected in step 803. Even if it is determined that the reception level is higher than the diversity threshold (YES in step 804), the antenna diversity function is not turned OFF since the diversity flag DiversityFlag is set to zero (NO in step 205).

However, if the level of the gap filler waves becomes higher than the level of the satellite waves to cause the apparatus to receive the gap filler, the diversity flag DiversityFlag is set to one in step 810, and it is determined that the reception level is higher than the diversity threshold (YES in step 804) by the following detection of the reception level (step 804), the antenna diversity function is turned OFF since the diversity flag DiversityFlag is set to one (YES in step 805) (step 806).

This means that the antenna diversity function is set to ON if the received waves are satellite waves, or the reception level is not higher than the diversity threshold. The antenna diversity function is switched OFF if the received waves are gap filler waves and the reception level is higher than the diversity threshold.

According to such configuration, the diversity function is switched OFF under a condition where the received waves are gap filler waves and the reception level is higher than the diversity threshold, that is, under a condition where sufficiently stable reception is possible without the use of the diversity function. As a result, the power consumption can be reduced.

In the third embodiment as well, the ON/OFF control of the antenna diversity function according to the third embodiment may be used in combination with either one or both of the switching control of the dynamic range of the LNA 11 (LNA 31) according to the first embodiment and the switching control of the time constant of the AGC 13 (AGC 33) according to the second embodiment.

This invention is applicable to a mobile broadcast receiving apparatus which selectively receives broadcast radio waves from a geostationary satellite or retransmitted radio waves from a gap filler according to reception levels thereof.

According to this invention, at least one of dynamic range of the low noise amplifier (LNA), the time constant of the automatic gain control circuit (AGC) and ON and OFF of the antenna diversity is switched according to a reception status of the mobile broadcast receiving apparatus. Therefore, stable reception of mobile broadcasting is possible even if a rapid level change occurs in the received waves. Further, the mobile broadcast receiving apparatus is enabled to rapidly recover from image distortion, and to reduce the power consumption.

What is claimed is:

1. A mobile broadcast receiving apparatus which selectively receives broadcast radio waves from a geostationary satellite or radio waves retransmitted from a gap filler according to a reception level thereof, the apparatus comprising:
    a low-noise amplifier circuit which low-noise amplifies a received signal;
    a level detection unit which detects the reception level;
    a received wave discrimination unit which determines whether the wave being received is the broadcast radio wave from the geostationary satellite or the radio wave retransmitted from the gap filler; and
    a range switching unit which switches a dynamic range of the low-noise amplifier circuit to a lower range when either the reception level detected by the level detection unit is not higher than a preset range switching level, or the received wave discrimination unit determines that the wave being received is the broadcast radio wave from the geostationary satellite, and switches the dynamic range of the low-noise amplifier circuit to an upper range when the reception level detected by the level detection unit is higher than the preset range switching level and the received wave discrimination unit determines that the wave being received is the radio wave retransmitted from the gap filler.

2. The mobile broadcast receiving apparatus according to claim 1 further comprising:
    an automatic gain control circuit which automatically controls a gain of a received signal;
    a switching frequency determination unit which determines a switching frequency between the broadcast radio wave from the geostationary satellite and the radio wave retransmitted from the gap filler; and
    a time constant switching unit which switches a time constant of the automatic gain control circuit to a smaller value when the switching frequency determination unit determines that the switching frequency is higher than a preset threshold, and switches the time constant of the automatic gain control circuit to a greater value when the switching frequency determination unit determines that the switching frequency is not higher than the threshold.

3. A mobile broadcast receiving apparatus which selectively receives a broadcast radio wave from a geostationary satellite or a radio wave retransmitted from a gap filler according to a reception level thereof, the apparatus comprising:
    an automatic gain control circuit which automatically controls a gain of a received signal;
    a switching frequency determination unit which determines a switching frequency between the broadcast radio wave from the geostationary satellite and the radio wave retransmitted from the gap filler; and
    a time constant switching unit which switches a time constant of the automatic gain control circuit to a smaller value when the switching frequency determination unit determines that the switching frequency is higher than a preset threshold, and switches the time constant of the automatic gain control circuit to a greater value when the switching frequency determination unit determines that the switching frequency is not higher than the threshold.

4. A mobile broadcast receiving apparatus which selectively receives a broadcast radio wave from a geostationary satellite or a radio wave retransmitted from a gap filler according to a reception level thereof, the apparatus comprising:
    a first reception circuit which receives either the broadcast radio wave from the geostationary satellite or the radio wave retransmitted from the gap filler;
    a second reception circuit which receives either the broadcast radio wave from the geostationary satellite or the radio wave retransmitted from the gap filler;
    a diversity circuit which selectively switches between an output of the first reception circuit and an output of the second reception circuit according to output levels of the first and second reception circuits;
    a level detection unit which detects the reception level;
    a received wave discrimination unit which determines whether the wave being received is the broadcast radio wave from the geostationary satellite or the radio wave retransmitted from the gap filler; and
    a diversity operation switching unit which switches the diversity circuit to an active state when either the reception level detected by the level detection unit is not higher than a preset threshold level or the received wave discrimination unit determines that the wave being received is the broadcast radio wave from the geostationary satellite, and switches the diversity circuit to an inactive state when the reception level detected by the level detection unit is higher than the preset threshold level and the received wave discrimination unit determines that the wave being received is the radio wave retransmitted from the gap filler.

5. The mobile broadcast receiving apparatus according to claim 4, wherein the first reception circuit and the second reception circuit each comprises:
    a low-noise amplifier circuit which low-noise amplifies a received signal; and
    an automatic gain control circuit which automatically controls a gain of the received signal, and wherein the mobile broadcast receiving apparatus further comprises a range switching unit which switches a dynamic range of the low-noise amplifier circuit to a lower range when either the reception level detected by the level detection unit is not higher than a preset range switching level or the received wave discrimination unit determines that the wave being received is the broadcast radio wave from the geostationary satellite, and switches the dynamic range of the low-noise amplifier circuit to an upper range when the reception level detected by the level detection unit is higher than the preset range switching level and the received wave discrimination unit determines that the wave being received is the radio wave retransmitted from the gap filler.

6. The mobile broadcast receiving apparatus according to claim 5, further comprising:
   a switching frequency determination unit which determines a switching frequency between the broadcast radio wave from the geostationary satellite and the radio wave retransmitted from the gap filler; and
   a time constant switching unit which switches a time constant of the automatic gain control circuit to a smaller value when the switching frequency determination unit determines that the switching frequency is higher than a preset threshold, and switches the time constant of the automatic gain control circuit to a greater value when the switching frequency determination unit determines that the switching frequency is not higher than the threshold.

7. The mobile broadcast receiving apparatus according to claim 4, wherein the first reception circuit and the second reception circuit each comprises:
   a low-noise amplifier circuit which low-noise amplifies a received signal; and
   an automatic gain control circuit which automatically controls a gain of the received signal, and
   wherein the mobile broadcast receiving apparatus further comprises:
   a switching frequency determination unit which determines a switching frequency between the broadcast radio wave from the geostationary satellite and the radio wave retransmitted from the gap filler; and
   a time constant switching unit which switches a time constant of the automatic gain control circuit to a smaller value when the switching frequency determination unit determines that the switching frequency is higher than a preset threshold, and switches the time constant of the automatic gain control circuit to a greater value when the switching frequency determination unit determines that the switching frequency is not higher than the threshold.

8. A control method for a mobile broadcast receiving apparatus which comprises a low-noise amplifier circuit which low-noise amplifies a received signal and an automatic gain control circuit which automatically controls a gain of a received signal, and which selectively receives a broadcast radio wave from a geostationary satellite or a radio wave retransmitted from a gap filler according to a reception level thereof, the method comprising:
   determining whether the wave being received is the broadcast radio wave from the geostationary satellite or the radio wave retransmitted from the gap filler; and
   switching a dynamic range of the low-noise amplifier circuit to a lower range when either the reception level is not higher than a preset range switching level or it is determined that the wave being received is the broadcast radio wave from the geostationary satellite, and switching the dynamic range of the low-noise amplifier circuit to an upper range when the reception level is higher than the preset range switching level and it is determined that the wave being received is the radio wave retransmitted from the gap filler.

9. The control method for a mobile broadcast receiving apparatus according to claim 8, further comprising:
   determining a switching frequency between the broadcast radio wave from the geostationary satellite and the radio wave retransmitted from the gap filler; and
   switching a time constant of the automatic gain control circuit to a smaller value when it is determined that a switching frequency is greater than a preset threshold, and switching the time constant of the automatic gain control circuit to a greater value when it is determined that the switching frequency is not greater than the preset threshold.

10. A control method for a mobile broadcast receiving apparatus which comprises a first reception circuit, a second reception circuit, and a diversity circuit which selectively switches between an output of the first reception circuit and an output of the second reception circuit according to output levels of the first and second reception circuits, and which selectively receives a broadcast radio wave from a geostationary satellite or a radio wave retransmitted from a gap filler according to a reception level thereof, the control method comprising:
   determining whether the wave being received is the broadcast radio wave from the geostationary satellite or the radio wave retransmitted from the gap filler; and
   switching the diversity circuit to an active state when either the reception level is not higher than a preset threshold level or it is determined that the wave being received is the broadcast radio wave from the geostationary satellite, and switching the diversity circuit to an inactive state when the reception level is higher than the preset threshold level and it is determined that the wave being received is the radio wave retransmitted from the gap filler.

11. The control method for a mobile broadcast receiving apparatus according to claim 10, wherein the first reception circuit and the second reception circuit each comprises a low-noise amplifier circuit which low-noise amplifies a received signal, and an automatic gain control circuit which automatically controls a gain of the received signal, and wherein the control method comprises:
   switching a dynamic range of the low-noise amplifier circuit to a lower range when either the reception level is not higher than a preset range switching level, or it is determined that the wave being received is the broadcast radio wave from the geostationary satellite, and switching the dynamic range of the low-noise amplifier circuit to an upper range when the reception level is higher than the preset range switching level and it is determined that the wave being received is the radio wave retransmitted from the gap filler.

12. The control method for a mobile broadcast receiving apparatus according to claim 11 further comprising:
   determining a switching frequency between the broadcast radio wave from the geostationary satellite and the radio wave retransmitted from the gap filler; and switching a time constant of the automatic gain control circuit to a smaller value when it is determined that the switching frequency is higher than a preset threshold, and switching the time constant of the automatic gain control circuit to a greater value when it is determined that the switching frequency is not higher than the threshold.

* * * * *